# 2,745,716

PRODUCTION OF POTASSIUM FLUOZIRCONATE

Alfred L. Hock, Clifton Junction, near Manchester, England, assignor to Magnesium Elektron Limited, Clifton Junction, near Manchester, England No Drawing. Application May 21, 1952,
Serial No. 289,200

Claims priority, application Great Britain June 14, 1951

1 Claim. (Cl. 23—88)

This invention relates to the production of potassium fluozirconates i. e. double salts of potassium fluoride and zirconium fluoride.

According to the method described in the specification of assignee company's British Patent No. 628,050 potassium fluozirconates corresponding to molecular ratios of $KF:ZrF_4$ between 1 and 2.5 may be obtained by reacting together potassium chloride and an aqueous hydrofluoric acid solution of zirconium fluoride containing at least 1 mole of HF per mole of $ZrF_4$, in proportions ranging from 1 to 3 moles of KCl per mole of $ZrF_4$.

It is found in practice, however, difficult to obtain fluozirconates having a $KF:ZrF_4$ molecular ratio less than 1.2 by the method described in the said prior patent specification. For example, the use of an excess of hydrofluoric acid does not readily produce this desired result. The object of the present invention is to facilitate preparation of potassium fluozirconate having a $KF:ZrF_4$ molecular ratio of 1.0 to 1.2 at a high zirconium efficiency.

According to the invention the process comprises incorporating in an aqueous medium, ingredients which in the absence of an excess of mineral acid will produce potassium fluozirconate having a $KF:ZrF_4$ molecular ratio greater than 1.2. This mineral acid is one selected from the group consisting of hydrochloric acid, surphuric acid and nitric acid so that the amount of such acid is not less than one mole equivalent per atom of zirconium. The final step in the process comprises recovering potassium fluozirconate from the mixture.

The concentration of the mineral acid is preferably kept to between 1 Normal and 3 Normal.

Thus, according to the present invention a mineral acid selected from the group comprising hydrochloric acid, sulphuric and nitric acid, may be added to a mixture of an aqueous hydrofluoric acid solution of zirconium fluoride and a potassium salt, such as the chloride, sulphate or nitrate, which in the absence of a mineral acid of the said group produces potassium fluozirconate having a $KF:ZrF_4$ molecular ratio greater than 1.2. Alternatively, the said mineral acid may be added to an aqueous solution or suspension of potassium fluozirconate having a $KF:ZrF_4$ molecular ratio greater than 1.2.

For example, I may react together potassium chloride solution and an aqueous solution containing zirconium fluoride, hydrofluoric acid and a mineral acid of the group comprising hydrochloric acid, sulphuric acid and nitric acid. In order to promote the formation of potassium fluozirconate of $KF:ZrF_4$ molecular ratio of close to 1.0, and within the range 1.0 to 1.2, the amount of added mineral acid is preferably increased in proportion to the amount of hydrofluoric acid initially present which in accordance with British Patent No. 628,050, owned by the assignee of the present application, must be at least 1 mole of hydrofluoric acid per mole of $ZrF_4$. The amount of mineral acid required to obtain potassium fluozirconate having a $KF:ZrF_4$ molecular ratio close to 1.0 is then preferably not less than 2 equivalent moles per mole of hydrofluoric acid. While the amount of potassium salt added does not affect the $KF:ZrF_4$ molecular ratio of the product, greater zirconium efficiency can be obtained by adding more than the theoretical 1 mole equivalent of potassium salt per mole of $ZrF_4$. Thus, when the zirconium efficiency is about 76% with an addition of 1 mole of potassium chloride per mole of $ZrF_4$, it increases to about 86% when 1.2 moles of potassium chloride per mole of $ZrF_4$ are added and gradually can be increased to about 95% when 4 moles of potassium chloride per mole of $ZrF_4$ are added. The temperature of the solution may be conveniently between 15° C. and 30° C. but may also be much higher, e. g. 70° C. without disadvantage.

The reaction may be represented by the following simplified general equation:

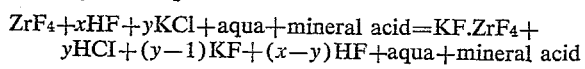

$ZrF_4 + xHF + yKCl + \text{aqua} + \text{mineral acid} = KF.ZrF_4 +$
$yHCl + (y-1)KF + (x-y)HF + \text{aqua} + \text{mineral acid}$ Alternatively I may prepare potassium fluozirconate having a $KF:ZrF_4$ molecular ratio above 1.2 by any known or suitable method and convert this to fluozirconate having a $KK:ZrF_4$ molecular ratio between 1 and 1.2 by reacting it with mineral acid. The potassium fluozirconate having a $KF:ZrF_4$ molecular ratio over 1.2 may, for example, be produced by using a substantially pure zirconium compound obtained from zirconium-containing minerals with fluorides of potassium. The potassium fluozirconate of $KF:ZrF_4$ molecular ratio above 1.2 may be in the form of dry crystals or of a suspension of crystals in mother liquor. The potassium fluozirconate of $KF:ZrF_4$ molecular ratio above 1.2 may also be in aqueous solution, for example, at a temperature of 90–100° C., the solution being cooled after adding the mineral acid to precipitate the fluozirconate having a $KF:ZrF_4$ molecular ratio of 1.0 to 1.2. The conversion may be represented by the following simplified equation:

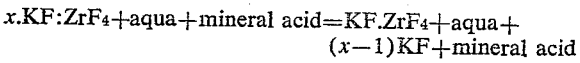

$x.KF:ZrF_4 + \text{aqua} + \text{mineral acid} = KF.ZrF_4 + \text{aqua} +$
$(x-1)KF + \text{mineral acid}$ In a preferred method of carrying out the invention, in such a manner as to produce potassium fluozirconate having a low $KF:ZrF_4$ molecular ratio of, e. g. 1.1, from normal potassium fluozirconate $K_2ZrF_6$, the normal salt is suspended in about five times its weight of cold water and sufficient cold commercial hydrochloric acid is added to make the concentration of HCl in the liquor 1.5 N to 3 N, e. g. about 2 N. The suspension is thoroughly stirred until conversion is complete and is then filtered. The product is washed free of chloride ions with cold water and dried, e. g. in a vacuum dryer at 100° C.

When the conversion is carried out in this manner over 90% of the zirconium is recovered in the product which has a molecular $KF:ZrF_4$ ratio of 1.0 to 1.2.

The following example illustrates but does not determine the limits of my invention:

Example 100 parts of normal potassium fluozirconate ($K_2ZrF_6$) are suspended in 600 parts of water at room temperature (15° C.) and 142 parts of commercial hydrochloric acid (S. Gr. 1.14) are added. The suspension is stirred for 2 hours and filtered. The product is washed free of chloride ions with cold water and dried in vacuo at 100° C. The yield is 77 parts of potassium fluozirconate, having a molecular $KF:ZrF_4$ ratio of 1.1. The zirconium recovery is 96%.

I claim:

A process for producing potassium fluozirconate corresponding to molecular ratios of $KF:ZrF_4$ of from 1.0 to 1.2 comprising providing an aqueous medium containing potassium fluozirconate both in solution and in suspension, said potassium fluozirconate corresponding to molecular ratios of KF:ZrF$_4$ greater than 1.2, adding to said aqueous medium at least one mineral acid selected from the group consisting of hydrochloric acid, sulphuric acid, and nitric acid, the amount of said mineral acid being at least 1 mole of acid per atom of zirconium and being sufficient to cause the production of potassium fluozirconate having said ratios of 1.0 to 1.2, and recovering the resulting potassium fluozirconate from the mixture.

References Cited in the file of this patent

UNITED STATES PATENTS

| | | |
|---|---|---|
| 2,500,792 | Blythe et al. | Mar. 14, 1950 |

FOREIGN PATENTS

| | | |
|---|---|---|
| 574,832 | Great Britain | Jan. 22, 1946 |